US 6,545,761 B1

(12) United States Patent
Aziz et al.

(10) Patent No.: US 6,545,761 B1
(45) Date of Patent: Apr. 8, 2003

(54) EMBEDDED INTERFEROMETER FOR REFERENCE-MIRROR CALIBRATION OF INTERFEROMETRIC MICROSCOPE

(75) Inventors: David J. Aziz, Tucson, AZ (US); Bryan W. Guenther, Tucson, AZ (US)

(73) Assignee: Veeco Instruments, Inc., Tucson, AZ (US)

( * ) Notice: Subject to any disclaimer, the term of this patent is extended or adjusted under 35 U.S.C. 154(b) by 0 days.

(21) Appl. No.: 09/452,334

(22) Filed: Nov. 30, 1999

(51) Int. Cl.[7] .................................................. G01B 9/02
(52) U.S. Cl. ...................................................... 356/497
(58) Field of Search ................................ 356/450, 497, 356/498, 499, 511, 512, 513, 514, 508

(56) References Cited

U.S. PATENT DOCUMENTS

| 5,978,086 A | 11/1999 | Aziz et al. .................. 356/357 |
| 6,002,480 A | * 12/1999 | Izatt et al. .................. 356/479 |

* cited by examiner

Primary Examiner—Frank G. Font
Assistant Examiner—Andrew H. Lee
(74) Attorney, Agent, or Firm—Antonio R. Durando; Durando Birdwell & Janke, PLC

(57) ABSTRACT

A laser interferometer is embedded into an interference microscope to precisely determine the in-focus position of the microscope objective's reference mirror. A collimated laser beam is introduced into the microscope system and split into two beams directed toward a calibration reference surface and the interference objective. The light reflected from the calibration reference surface is returned to the camera. The light into the interference objective is focused onto the reference mirror and returned to the camera. For the purpose of calibration, the two beams are combined at the camera to produce interference fringes. When the reference mirror is in focus, the returned beam is collimated; if the mirror is on either side of focus, the beam is either converging or diverging. Accordingly, the interferogram produced at the camera reflects the in-focus or out-of-focus condition of the reference mirror. The curvature of the wavefront returned from the reference mirror is determined electronically by analyzing the interference fringes produced with the beam returned from the calibration reference surface. By minimizing the curvature of the reference-mirror wavefront as the mirror is translated along the optical path, the reference mirror can be focused with an accuracy greater than possible by visual observation. Furthermore, by automating the focusing system with a precise translation mechanism driven by closed-loop control, operator-to-operator variations are completely eliminated.

49 Claims, 12 Drawing Sheets

EMBEDDED INTERFEROMETER FOR REFERENCE-MIRROR CALIBRATION OF INTERFEROMETRIC MICROSCOPE

BACKGROUND OF THE INVENTION

1. Field of the Invention

This invention is related in general to the field of interferometry and, in particular, to a method and apparatus for optimizing the focal-point calibration of an interferometric microscope.

2. Description of the Related Art

Microscope objectives are commonly used in interferometric devices for focusing a beam of light on a sample surface and a reference surface to produce interference fringes representative of the optical path difference (OPD) between the test and reference path. As illustrated in simple schematic form in FIG. 1, a typical interferometric microscope 10 consists of a microscope objective focused on a test surface S and incorporating an interferometer. The interferometer, shown in Linnik configuration for illustration, comprises a beam splitter 12 and a reference mirror R such that the light beam W directed to the sample surface S is split and also directed to the reference mirror. As is well understood by those skilled in the art, the light beams reflected from the reference mirror R and the test surface S (the reference and test beams, respectively) are combined to produce interference fringes as a result of the optical path difference between the reference mirror and the test surface S. The light is typically passed back through the interferometric microscope objective 10 and appropriate imaging optics 14 toward an imaging array 16 positioned in a camera in coaxial alignment with the objective. The imaging array usually consists of individual charge-coupled-device (CCD) cells or other sensing apparatus adapted to record a two-dimensional array of signals corresponding to interference effects produced by the interferometer as a result of light reflected at individual x-y coordinates or pixels in the surface S and received at corresponding individual cells in the array. Appropriate electronic hardware (not shown) is also provided to process the signals generated by each cell and transmit them to a computer 17 for further processing. Thus, an interference-fringe map is generated by detecting the intensity of the light signal received in each cell of the array. The map may be displayed on a monitor 19 connected to the processing unit 17. Additional information about the test surface S can be gained by varying the OPD between the reference and test paths with a scanning device (not shown) shortening or lengthening either the reference path or the test path.

The present invention is directed at improving the focus calibration of the reference mirror R in such an interferometric microscope. As shown in FIG. 1, the Linnik configuration of a microscope objective includes a white light source 18 and imaging optics 20 providing an illumination beam W to the system through a beam splitter or equivalent device 22. The illumination beam is then focused, ideally, in the entrance pupils E and E' of the reference and test imaging optics 24 and 26, respectively. This is known as Kohler illumination, and produces approximately uniform illumination on the sample surface S and the reference surface R. By way of calibration, the reference mirror R is set at the focal point of the imaging optics 26 through a process based on a visual determination of best focus produced by axially shifting the reference mirror with respect to its imaging optics 26, as one skilled in the art would readily understand.

One common way of determining best focus is by imaging a variable aperture, known as a field stop, onto the reference mirror such that the image of the edges of the aperture, upon reflection from the reference mirror, is sharply in focus at the imaging array 16 when the reference mirror is in focus. Once the optimal distance x between the lens 26 and the mirror R is found my manual manipulation, the position of the mirror within the microscope 10 may be fixed at the factory for a particular instrument. However, due to practical limitations on stability, it often must be left adjustable and set by the user during setup procedures.

Such manual setting of the reference-mirror focus suffers from two distinct limitations. First, it is based on an operator's visual observation of best focus, which is necessarily approximate because of the inability of the human eye to distinguish image variations produced by very small focal shifts. Thus, it is limited at best to a precision equal to the depth-of-focus of the objective (often considered to be +/−0.25 wavelengths of defocus in the converging wavefront). Second, the approach is inherently subjective, leading to different results from different operators.

Moreover, as interference microscopes have become standard quality-control tools in production environments, such as for testing the topography of magnetic heads, greater measurement precision and repeatability are required. Such interference microscopes are now capable of making measurements with sub-nanometer precision. Accordingly, the precise in-focus position of the reference mirror has become more and more critical. As is well known in the art, the depth of focus (DOF) of an objective is inversely proportional to the square of its numerical aperture. Thus, the depth of focus decreases rapidly with the objective's magnification. For example, while a Nikon® 5x/0.13NA objective has a depth of focus of about 30 microns, a Nikon® 100x/0.95NA objective has a DOF smaller than one micron. Therefore, minute shifts in the position of the reference surface R with respect to its imaging optics 26 are sufficient to cause the reference surface to be out of focus and produce incorrect profile measurements. Accordingly, it is now necessary to obtain extremely tight levels of control over the defocusing effects of the reference mirror and it has become desirable to periodically and routinely recalibrate interferometric microscopes.

A significant improvement toward these ends was achieved with the development of athermalized interference objectives to suppress the effects of environmental changes. As detailed in U.S. Pat. No. 5,978,086, incorporated herein by reference, in these objectives the reference mirror is held at the optimal focus location over a range of temperatures by adding structural components that offset the effects of temperature variations. Each component is coupled sequentially, such that the thermal response of the objective assembly is substantially the linear combination of the response of each component and is designed to cause a shift in the opposite direction to the shift produced by a temperature change in the unmodified device. The thermal characteristics and dimensions of the components are chosen empirically to minimize the shift of the reference mirror with respect to its in-focus position in the interferometric objective as a function of temperature.

In spite of this improvement, defocusing effects result from vibrations, wear, and other environmental forces that affect the reference mirror in addition to temperature changes. Thus, it remains desirable, and for some applications it has become necessary, to assure the current in-focus position of the reference surface of interferometric microscopes. This invention is directed at providing a solution to this problem. Furthermore, this invention readily allows focus of the reference mirror with a level of precision that cannot be obtained with a visual focus technique.

BRIEF SUMMARY OF THE INVENTION

One primary object of this invention is a method for setting the in-focus position of the reference surface of an interferometric microscope objective that is not operator-dependent.

Another object of the invention is a method that is suitable for automated implementation.

Still another objective is a method and corresponding implementing apparatus that are suitable for periodic calibration of an interferometric microscope objective while in service.

Another goal of the invention is a method and apparatus that are suitable for incorporation within existing instruments.

A final object is a procedure that can be implemented easily and economically according to the above stated criteria.

Therefore, according to these and other objects, the present invention consists of incorporating a laser interferometer into an interference microscope to precisely determine the in-focus position of the microscope objectives reference mirror. A collimated laser beam is introduced into the microscope system and split into two beams directed toward a special calibration reference surface and the interference objective. The light reflected from the special reference surface is returned to the camera. The light into the interference objective is focused onto the reference mirror and returned to the camera. When the reference mirror is in focus, the returned beam is collimated; if the mirror is on either side of focus, the beam is either converging or diverging. Accordingly, the interferogram produced at the camera reflects the in-focus to out-of-focus condition of the reference mirror. For the purpose of calibration, the objective's reference path length is scanned to shift the interference fringes produced by the interference of the beam reflected by the reference mirror with the light reflected by the calibration reference surface. Equivalently, the path length of the beam reflected by the special reflectance surface can be scanned for the purpose of calibration. The curvature of the wavefront returned from the reference mirror is determined electronically by analyzing the interference fringes produced with the beam returned from the calibration reference surface. By minimizing the curvature of the reference-mirror wavefront as the mirror is translated along the optical path, the reference mirror can be focused with an accuracy greater than possible by visual observation. Furthermore, by automating the focusing system with a precise translation mechanism driven by closed-loop control, operator-to-operator variations are completely eliminated.

Various other purposes and advantages of the invention will become clear from its description in the specification that follows and from the novel features particularly pointed out in the appended claims. Therefore, to the accomplishment of the objectives described above, this invention consists of the features hereinafter illustrated in the drawings, fully described in the detailed description of the preferred embodiment and particularly pointed out in the claims. However, such drawings and description disclose but one of the various ways in which the invention may be practiced.

DESCRIPTION OF THE PREFERRED EMBODIMENT OF THE INVENTION

The present invention is based on the idea of embedding a laser interferometer into a white-light interference microscope for the purpose of automating the in-focus calibration of the reference mirror of the microscope objective. The resulting combination affords the means for automating the calibration process, which in turn optimizes its accuracy and repeatability.

Figure 1:
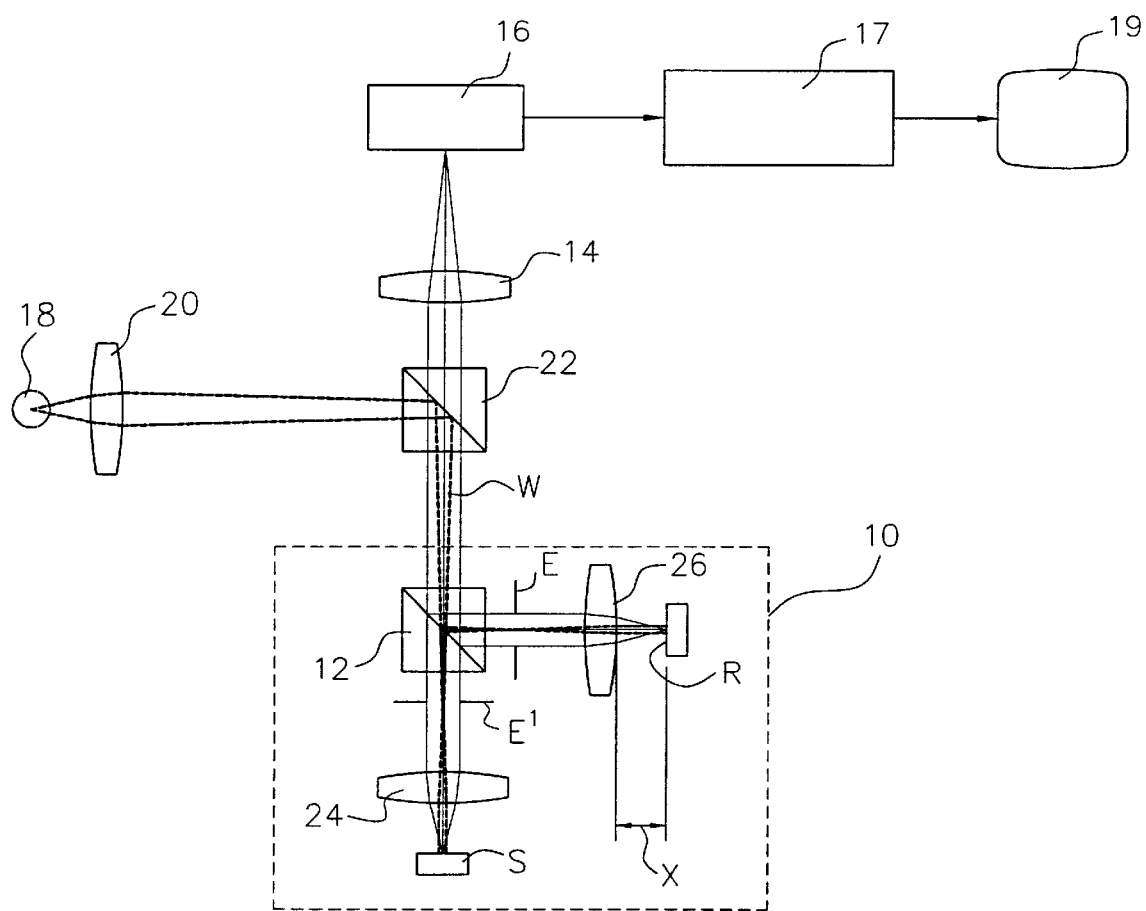
FIG. 1 is a simplified schematic representation of a prior-art Linnik interferometric microscope.
Figure 2:
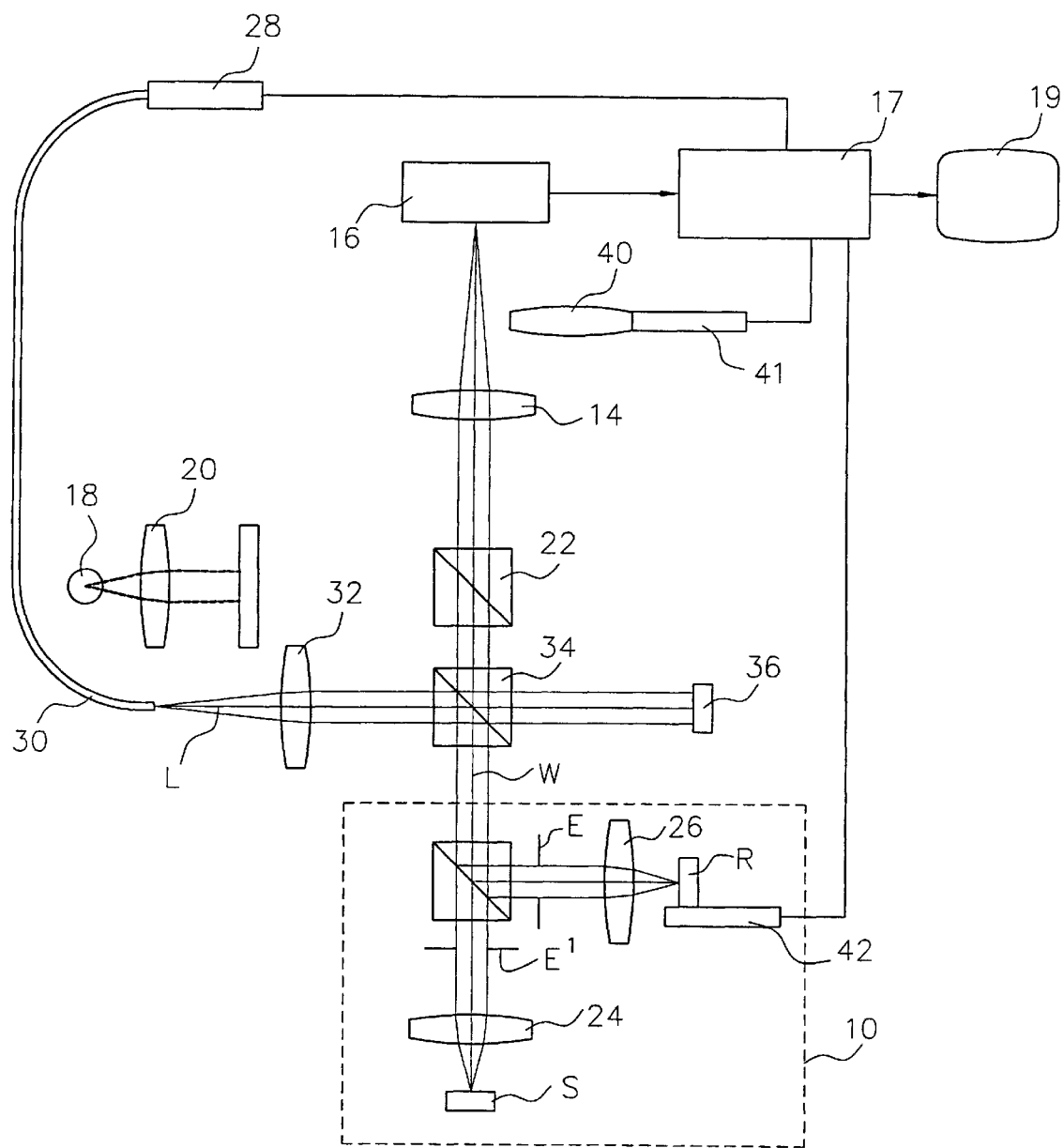
FIG. 2 is a schematic representation of the microscope of FIG. 1 incorporating a laser interferometer according to the invention.

For the purposes of this disclosure the term "lens" is intended to refer to any focusing device such as, without limitation, lenses, mirrors, and lens/mirror combinations. Referring to the drawings, wherein like parts are designated throughout with like numerals and symbols, FIG. 2 illustrates in schematic form the concept of the invention. The embedded interferometer includes a laser source 28 producing a light beam L, preferably conveyed by an optical fiber 30, that is collimated by a collimating lens 32 and directed toward a beam splitter 34 in the main optical path of the interference microscope objective 10. The splitter 34 divides the collimated beam L into a calibration reference beam directed toward a calibration reference surface 36 and an objective beam directed toward the interference microscope objective 10. The objective beam is then split again by the beam splitter 12 of the microscope and directed toward the reference mirror R. In order to eliminate or minimize interference by the sample surface S during calibration, the beam to the sample is either blocked or greatly reduced in intensity by placing the sample clearly out of focus. In addition, the beam from the source 18 is blocked, as illustrated, or turned off. The beam splitters are shown as cubes in the figures, but plates could obviously be used equivalently in the preferred embodiment of the invention.

Figure 3:
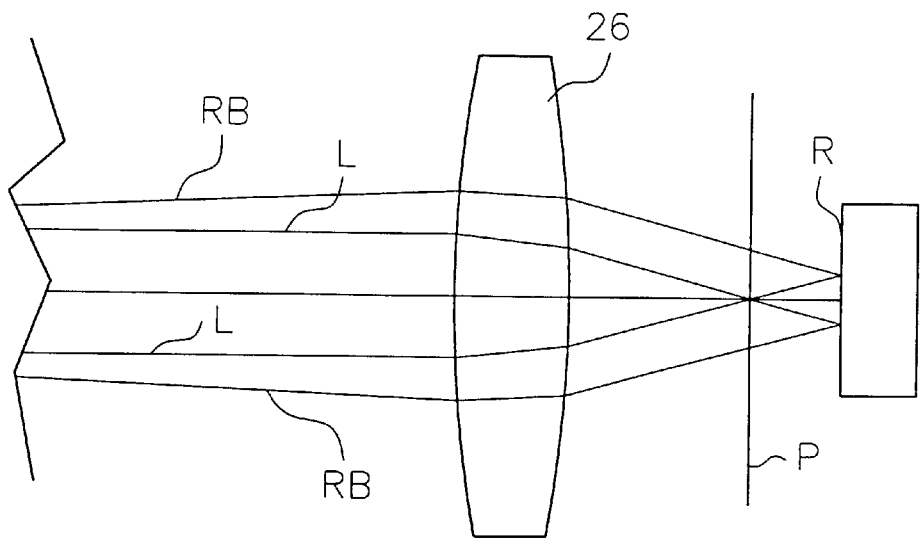
FIG. 3 illustrates the converging return wavefront produced by a collimated reference beam when the reference mirror of the interference microscope is positioned further from the imaging lens than the focal plane.
Figure 4:
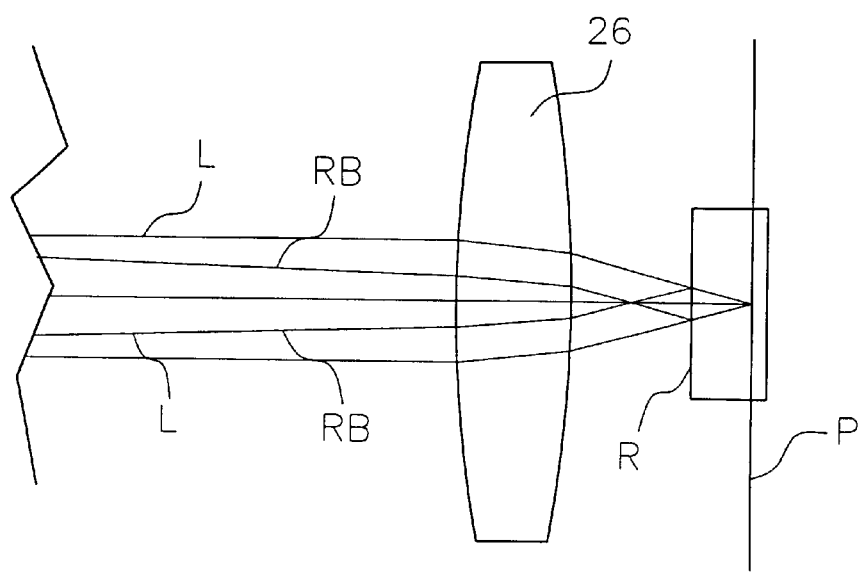
FIG. 4 illustrates the diverging return wavefront produced by a collimated reference beam when the reference mirror of the interference microscope is positioned closer to the lens than the focal plane.

Thus, the laser beam L can be used to conduct interferometric measurements of fringes produced by the combination of the light beams reflected from the reference mirror R and the calibration reference surface 36. When the reference mirror R is farther than the focal plane P of the lens 26, its out-of-focus position produces a converging return beam RB, as illustrated schematically in FIG. 3. When the reference mirror R is closer to the lens 26 than its focal plane P, the out-of-focus position produces a diverging return beam RB, as illustrated in FIG. 4. In both cases, interferograms of the combined beams can be used advantageously to identify the position of the reference mirror R with respect to the focal plane P and to drive the mirror automatically to its focused position.

Figure 5:
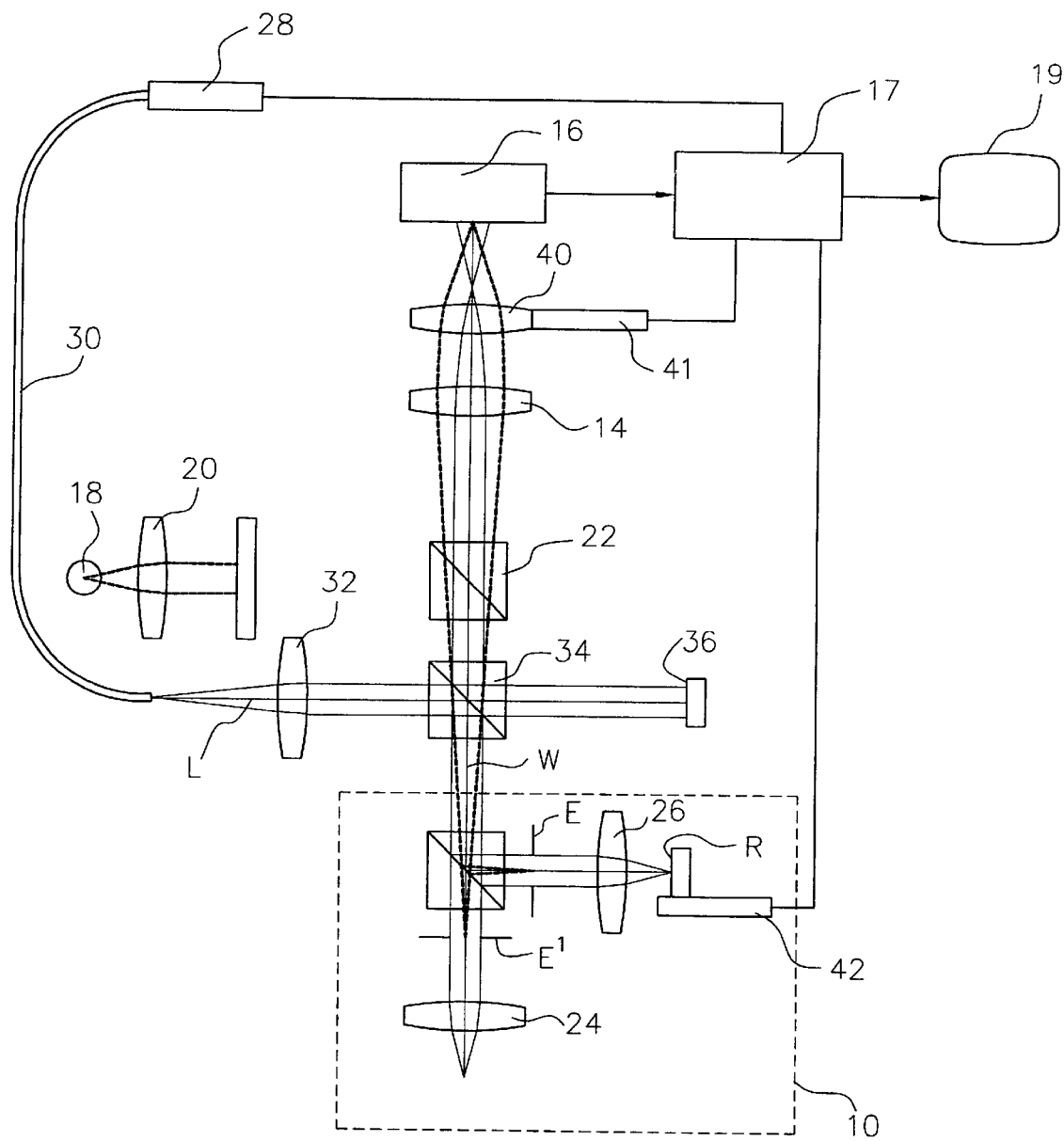
FIG. 5 is a schematic diagram illustrating the conoscopic imaging of the interference objective's exit pupil on the detector array of the system according to the calibration mode of the invention.

As would be clearly understood by one skilled in the art, in order to identify and measure the divergence or convergence of the wavefront RB returned from the reference mirror R during calibration, the exit pupil E of the interference objective 10 is preferably imaged on the camera 16 to provide a recognizable pattern for visual and electronic analysis, as illustrated schematically by the beam path EB in FIG. 5. This is known as conoscopic imaging. To that end, a conoscopic imaging lens 40 is also removably placed in the system's optical path during calibration measurements. The lens 40 is otherwise removed by an automated mechanism 41 from the optical path during normal orthoscopic imaging of the sample surface S. Finally, a conventional focussing mechanism 42 is provided to translate the position of the reference mirror R with respect to the focal plane P of the imaging lens 26.

In operation, the reference arm of the interference microscope 10, which includes the lens 26 as well as the reference mirror R, is scanned in normal fashion to shift the interference fringes produced with the collimated laser light L. Obviously, an equivalent result would be achieved by scanning the calibration reference mirror 36 instead. However, operating on the lens 26, in conjunction with the mirror R, is more efficient because the same scanning mechanism used to translate the reference arm (lens 26 and mirror R) with respect to the test arm (lens 24 and test surface S) to perform interferometric measurements in normal system operation can be used advantageously also to effect the scanning operation of the invention.

Figure 6:
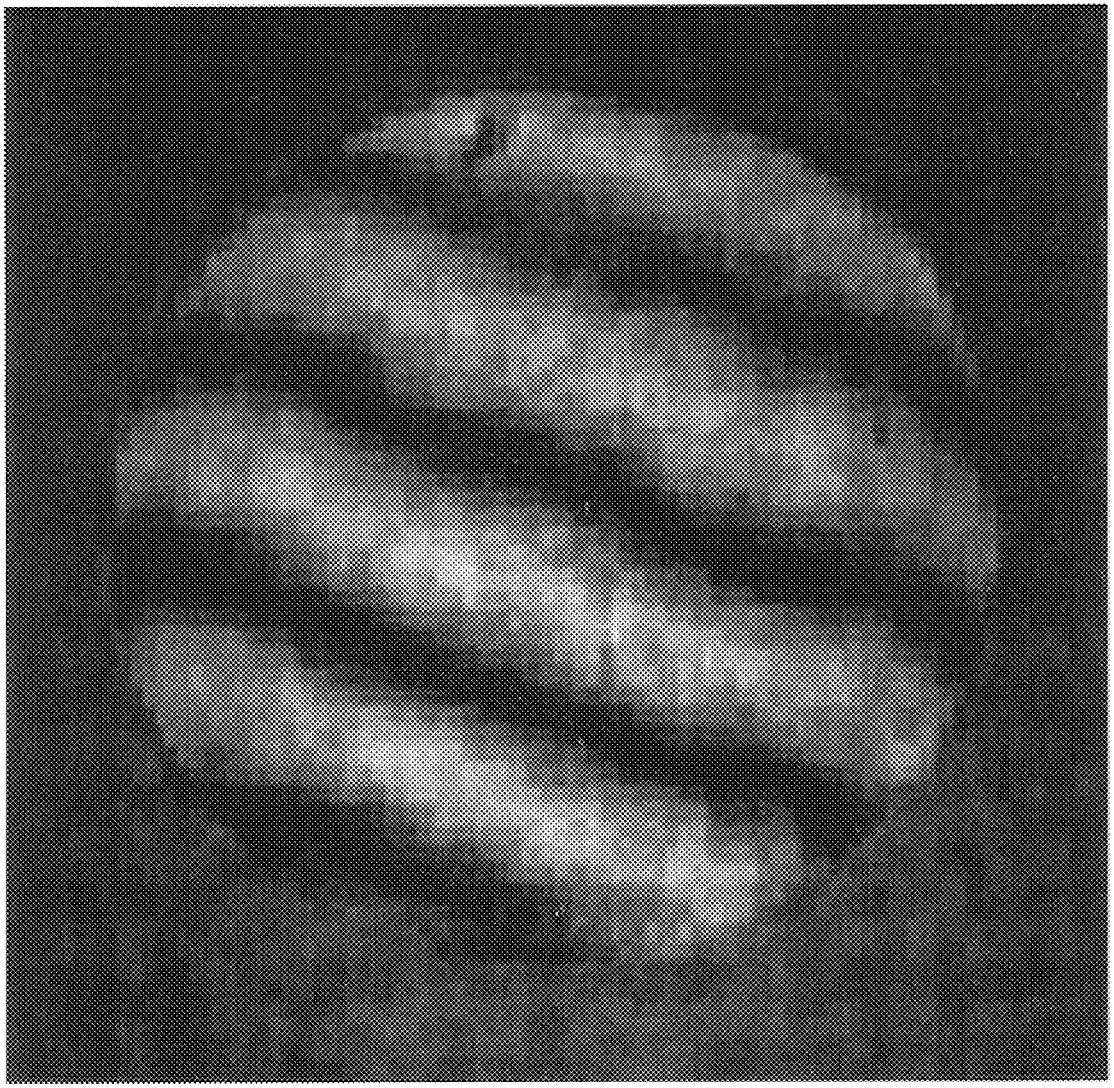
FIG. 6 is an interferogram of the exit-pupil image of the interference objective produced with tilt when the reference mirror is in focus.
Figure 7:
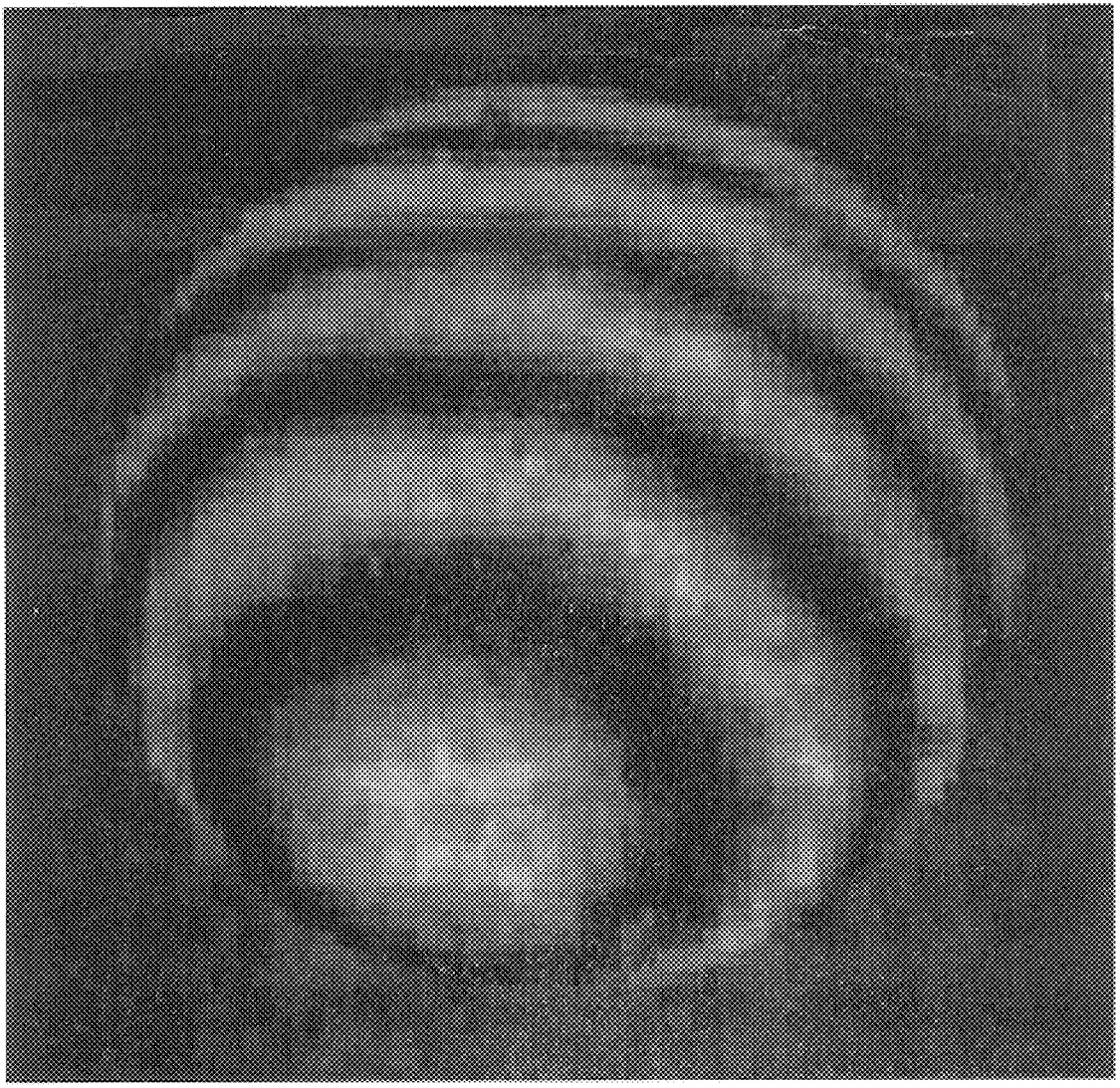
FIG. 7 is an interferogram of the exit-pupil image of the interference objective produced with tilt when the reference mirror is positioned farther than the focal length from the imaging lens.
Figure 8:
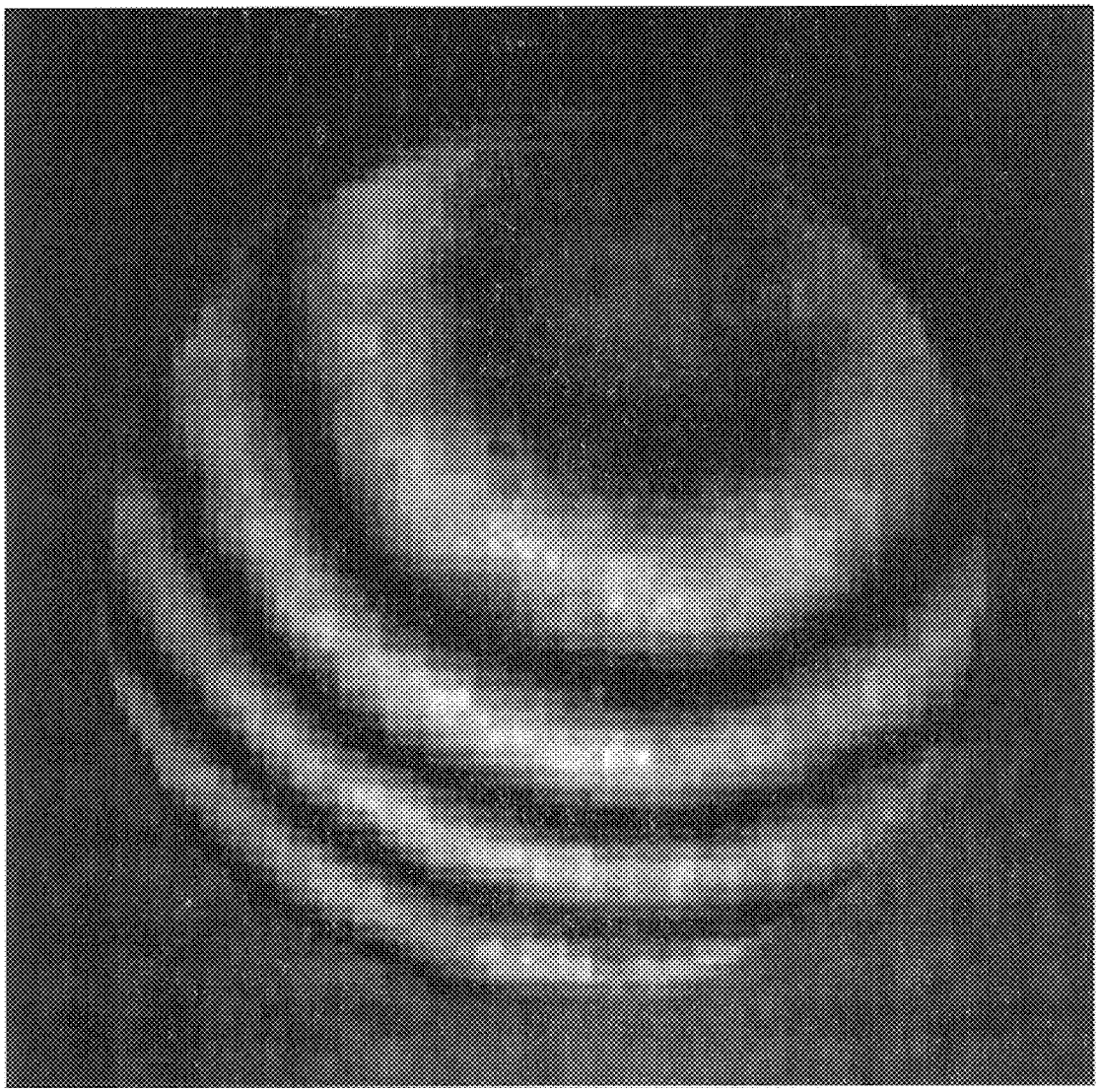
FIG. 8 is an interferogram of the exit-pupil image of the interference objective produced with tilt when the reference mirror is positioned between the imaging lens and its focal plane.

Using the apparatus of the invention, the focal position of the reference mirror R can be checked periodically and recalibrated automatically. The primary light source 18 is turned off, the sample surface S is taken out of focus of its imaging lens 24 (or the beam is blocked), the lens 40 is introduced into the optical path, and the laser 28 is energized. In order to avoid undue delay while allowing the laser output to stabilize, the laser will typically remain energized and the beam blocked or unblocked as desired. When the mirror R is in focus, interference between the wavefront in the exit pupil E of lens 26 and the wavefront reflected by the calibration surface 36, together imaged onto the camera 16, is substantially uniform without interference fringes. In the presence of tilt between the two interfering beams, the interference pattern will have straight-line fringes, as shown in the interferogram of FIG. 6 (deviations from straightness are indicative of aberration in one or both of the beams). If the mirror R is out of focus on either side of the focal plane of the imaging lens 26, the exit-pupil image contains similar, clearly identifiable, curved interference fringes, as illustrated for each case in FIGS. 7 and 8. FIG. 7 illustrates the interferogram of the exit pupil resulting from converging return light; FIG. 8 illustrates an interferogram corresponding to diverging return light. The same amount of tilt between the beams is present in the interferograms of FIGS. 6–8; only the focus of the reference mirror has been changed. In practice, these visually discernible interference fringes can also be identified and mapped by light intensity measurements utilizing the same light detection and processing apparatus used to measure the surface profile of a sample S. Appropriate software is utilized to determine whether fringes produced by an out-of-focus condition are present. These kinds of intensity measurements and mapping calculations are performed routinely in the art to profile sample surfaces. Therefore, the same techniques, hardware and software can be applied to profile the interferogram produced by the embedded interferometer during calibration.

Figure 9:
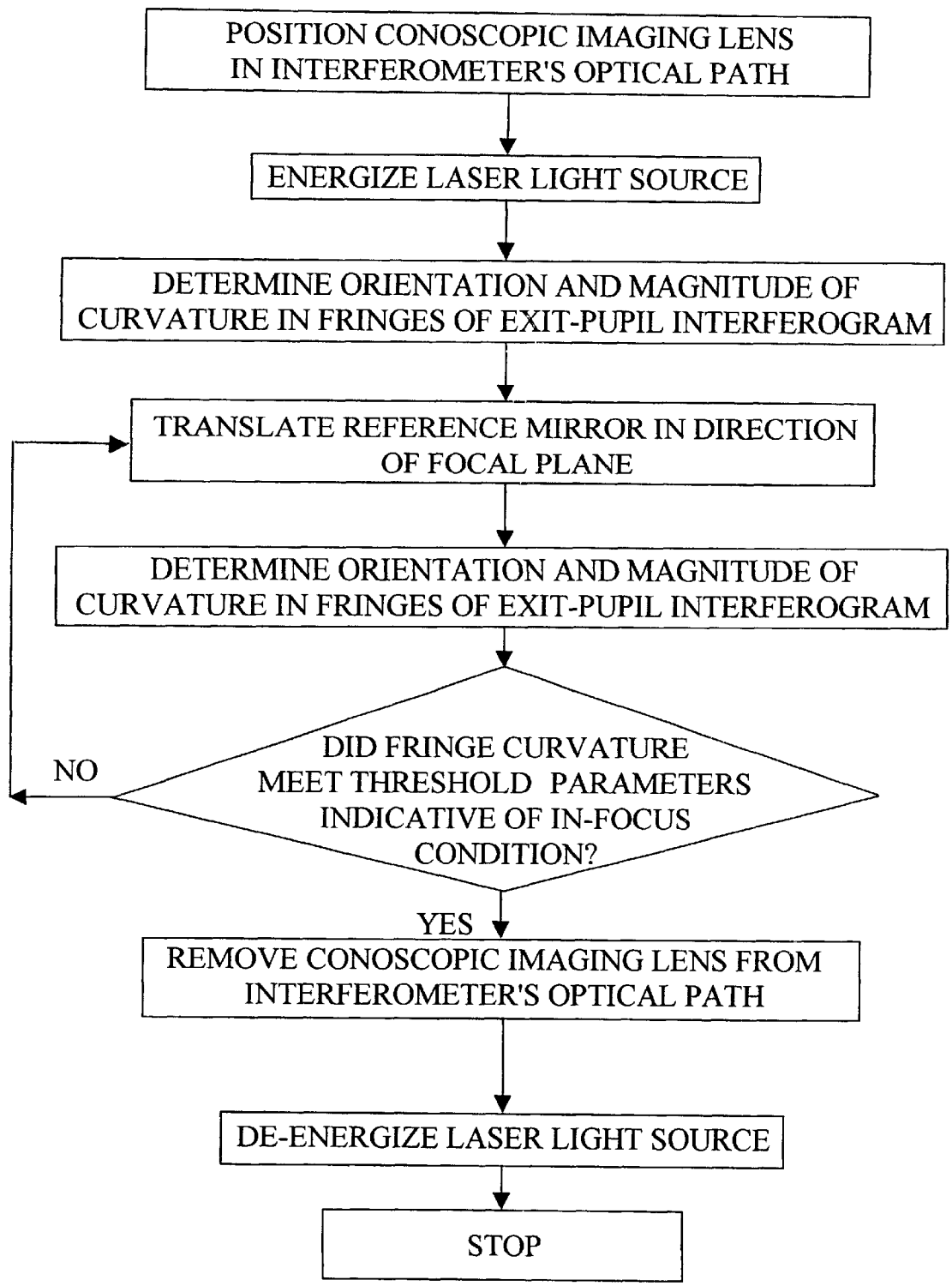
FIG. 9 is a diagram of the steps involved in the closed-loop automated control system of the invention.

In operation, a phase-shifting interferometry measurement, such as is routinely performed with interference microscopes, is used to precisely determine the amount and direction of defocus. For example, the interferogram of FIG. 7 corresponds to a mirror position about 0.9 microns outside the focal plane, while FIG. 8 corresponds to a mirror position about 0.9 microns inside the focal plane. Based on this information, the mirror is then translated by the focusing mechanism 42 in the direction of focus while interferometric measurements are made to progressively refine the mirror's position. A conventional closed-loop control system implemented in known manner by appropriate software in the processor 17 can be used for this purpose (FIG. 2). FIG. 9 illustrates the steps of the procedure of the invention.

When the desired reference mirror position is reached, as determined by an empirical threshold based on resolution and other limiting parameters (i.e., the situation reflected by the interferogram of FIG. 6), the mirror is known to be in focus and the calibration process is concluded. It is important to note that the optimal position of the reference mirror may actually be somewhat to one side or the other of the focal plane. The interferograms of FIGS. 6–8 show a small amount of third-order spherical aberration to be present. As is well known in the art, the optimal reference mirror position in this case would be shifted slightly from the focal plane of lens 26 in order to balance the spherical aberration with a small amount of defocus. Thus, for the purposes of this disclosure, the "in-focus" position is intended to also include the "best-focus" position; that is, the position where the effect of spherical aberrations of the focusing optics are minimized by placing the mirror slightly away from the paraxial focal plane to produce an optimal image. The conoscopic imaging lens 40 is then removed from the instrument's optical path, the laser light source 28 is diverted, blocked, or turned off (preferably automatically, by appropriate software in the processor 17), and normal interference microscope use can resume knowing that the reference mirror R is in focus with a much greater degree of precision than heretofore possible by manual calibration. Accordingly, high-magnification objectives can be readily used without loss of accuracy and/or resolution.

Thus, this disclosure teaches a convenient and effective method for automatically focusing the reference mirror of an interference microscope by providing an embedded interferometer adapted to automatically determine the convergence or divergence of the mirror's return wavefront during a calibration cycle. Based on this determination, a feedback loop is utilized to drive the mirror to its in-focus position. It is noted that the disclosure is based on a white-light objective of Linnik configuration, but it is equally applicable to other interference microscope objectives so long as they are suitable for use on a system that allows incorporation of a substantially monochromatic collimated beam directed to the reference mirror and to an additional calibration reference surface. In fact, the principle of the invention can be applied advantageously to any optical device requiring optimal in-focus placement of a surface with respect to a particular objective, for example in the examination of a smooth reflective test surface with a microscope. By providing a collimated laser beam directed toward the surface of interest, its position relative to focus can be determined by analyzing the shape of the return wavefront after reflection from the surface in the same manner illustrated above for an interference objective.

It is also understood that, while the invention is described in terms of its preferred embodiment which employs a collimated beam entering the lens 26 and coming to a focus on the reference mirror R, it is possible to implement the invention in equivalent fashion using a diverging or a converging beam entering the lens 26. In such case, the beam reflected from the in-focus reference mirror would not be collimated upon passage back through the imaging optics. However, as one skilled in the art would readily understand, if the degree of divergence or convergence of the incident beam, as well as the properties of the lens, are known, the reflected wavefront when the reference mirror is in best focus can also be determined and used as a target for the focusing system. Thus, the same closed-loop positioning technique can be used to translate the reference mirror R to the appropriate location to obtain this predetermined, non-collimated, reflected wavefront. Accordingly, the invention should not be regarded as limited to collimated incident beams.

Figure 10:
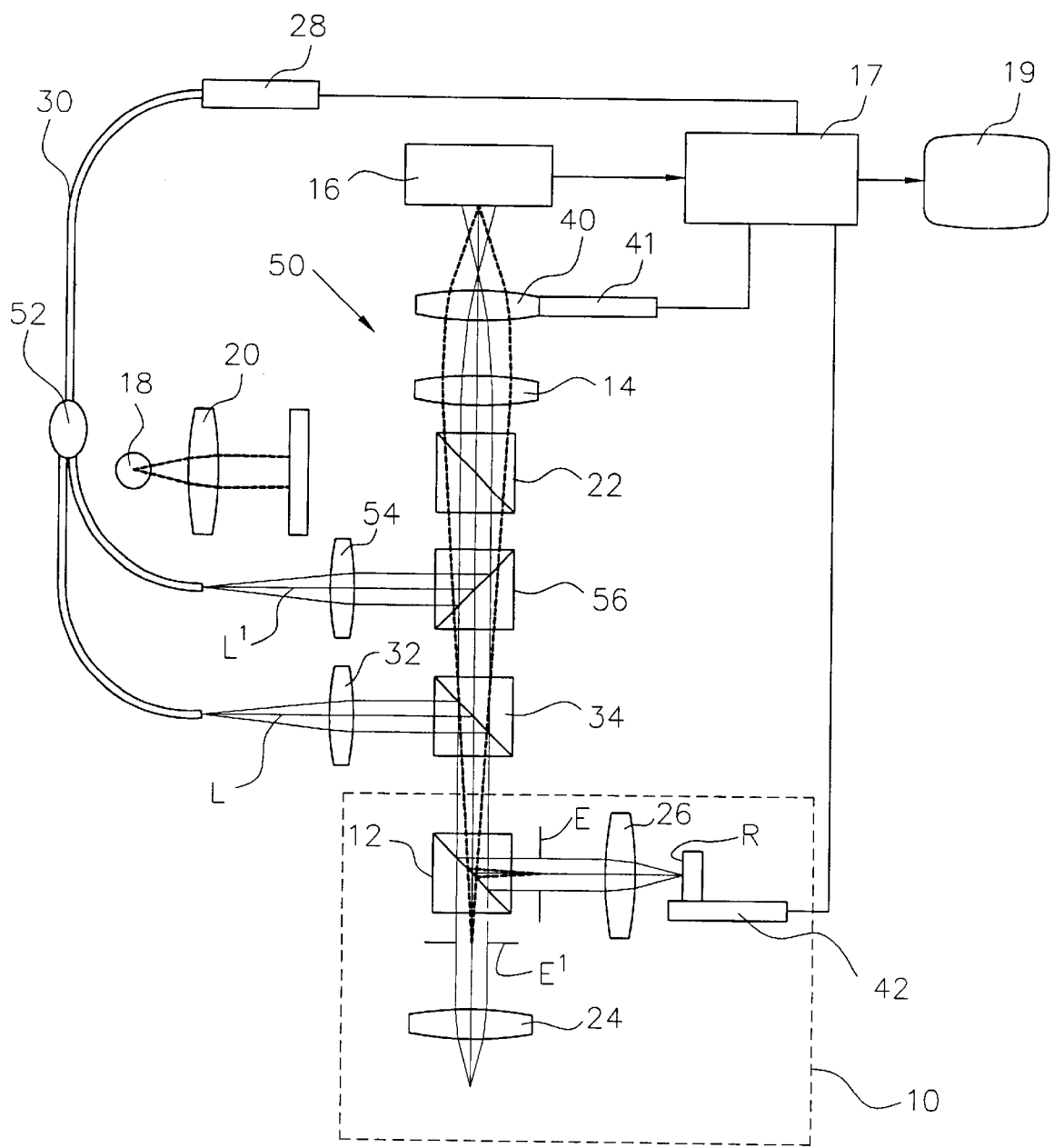
FIG. 10 shows schematically an embodiment of the invention wherein two laser beams are produced by a fiber-optic splitter; one beam is directed toward the reference mirror, while the other is directed toward the detector array of the interference microscope.

Furthermore, in accordance with the general concept of the invention, it is understood that it can be implemented in various alternative optical embodiments that make it possible to determine the shape of the return wavefront from the reference mirror R. As would be understood by those skilled in the art, this can be accomplished even without a calibration reference surface 36 by interfering the return wavefront RB with a separate collimated beam of light (which may result from splitting the laser beam L, as in the case illustrated for the preferred embodiment of FIG. 5) in the optical path to the sensor array 16, or equivalently by passing the return wavefront through a shearing interferometer, such as a shear plate, to produce two interfering beams. For example, FIG. 10 shows schematically an embodiment 50 of the invention wherein two laser beams L and L' are produced by a fiber-optic splitter 52 (or, equivalently, by two separate compatible lasers); the first beam L is directed toward the reference mirror R, as explained above, while the second beam L' is collimated and reflected directly toward the detector array 16 by a lens 54 and a reflective surface 56, respectively.

Figure 11:
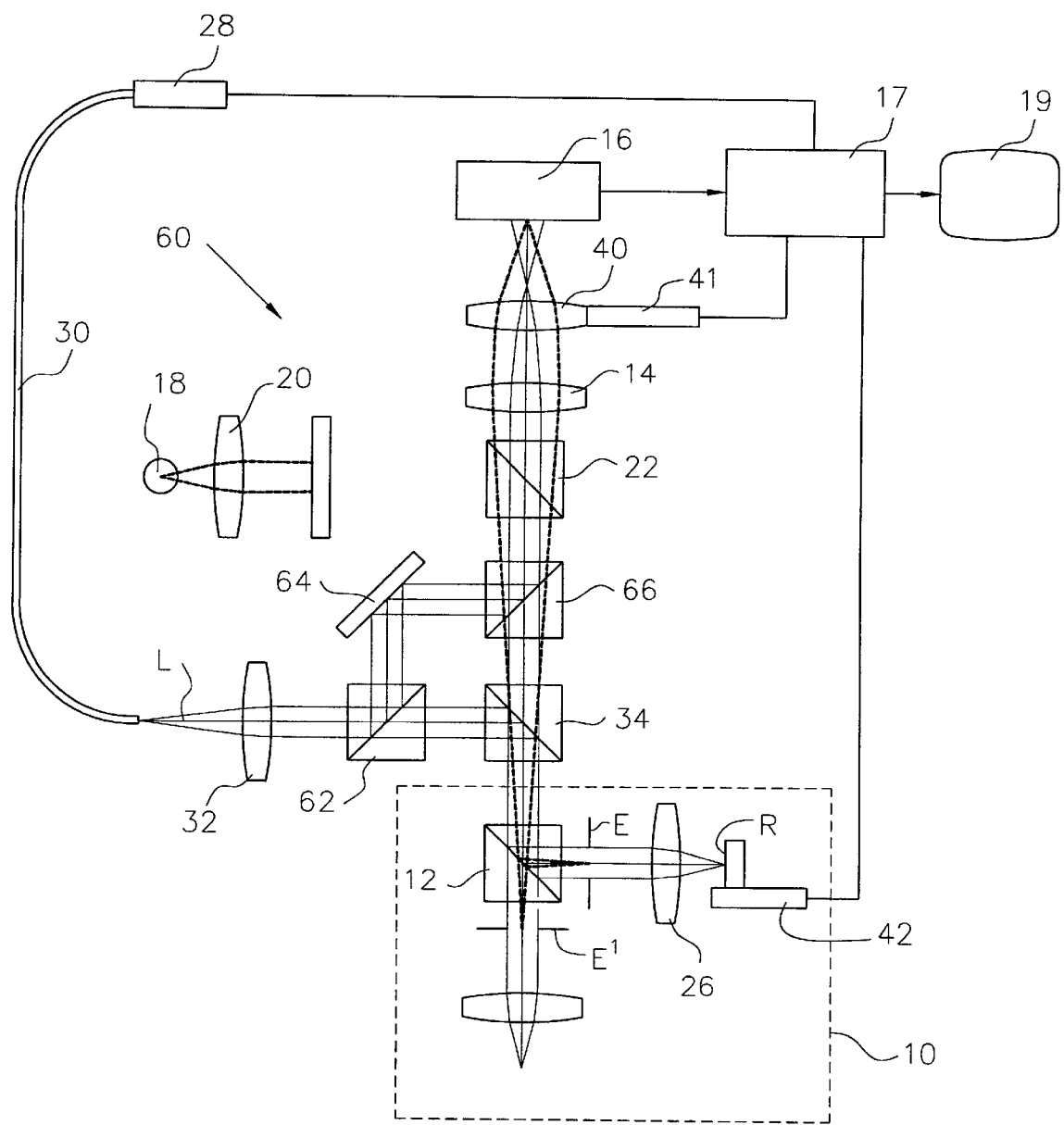
FIG. 11 shows another embodiment of the invention implemented by splitting the single beam out of an optical fiber in a splitter and by routing one of the resulting beams directly to the imaging array using two additional reflective surfaces.

Another embodiment 60 of the invention is implemented by splitting the single beam L out of the optical fiber 30 in a splitter 62 and routing it directly to the imaging array 16 using two additional reflective surfaces 64 and 66, as illustrated in FIG. 11.

Figure 12:
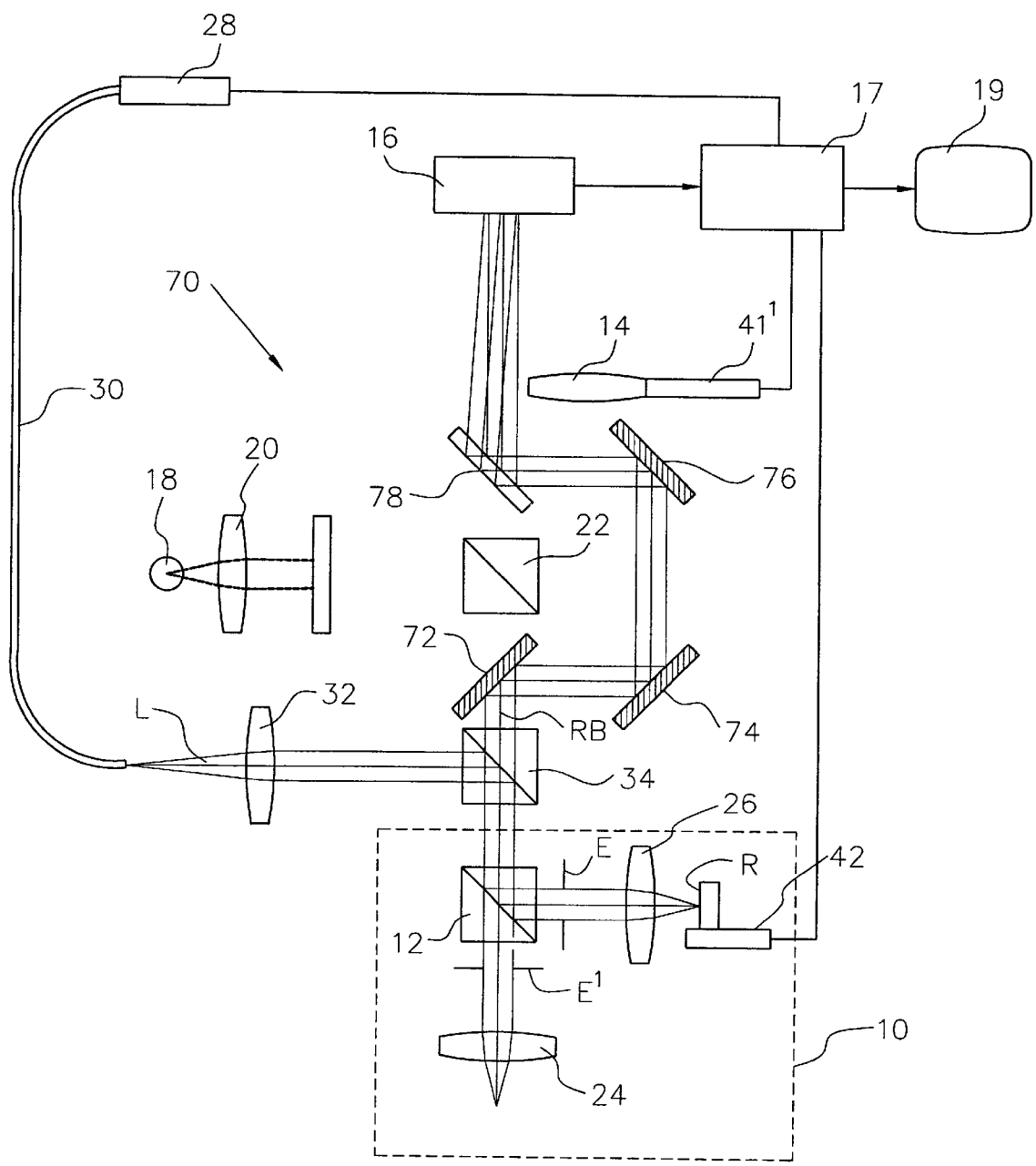
FIG. 12 shows an equivalent embodiment of the invention using a single light beam and a shear plate to produce two interfering wavefronts emerging therefrom.

An equivalent implementation 70 using a single light beam L and a shear plate is shown in FIG. 12. The return wavefront RB produced by the laser beam L is diverted in a splitter 72, re-directed by folding mirrors 74,76, passed through a shear plate 78, and directed to the array 16. It is well known in the art that the interference of the waves emerging from the shear plate will produce parallel fringes having orientation depending on whether the incident wavefront is plane or spherical (i.e., diverging or converging). Therefore, the direction of the fringes in an interferogram of the light detected by the sensor 16 in relation to their in-focus position enables the immediate identification of the out-of-focus condition of the mirror R and its subsequent calibration according to the invention. It is noted that this implementation would not require the use of a conoscopic imaging lens 40. In addition, the imaging lens 14 would need to be removed during calibration; therefore, an automated mechanism 41' is provided for that purpose.

Figure 13:
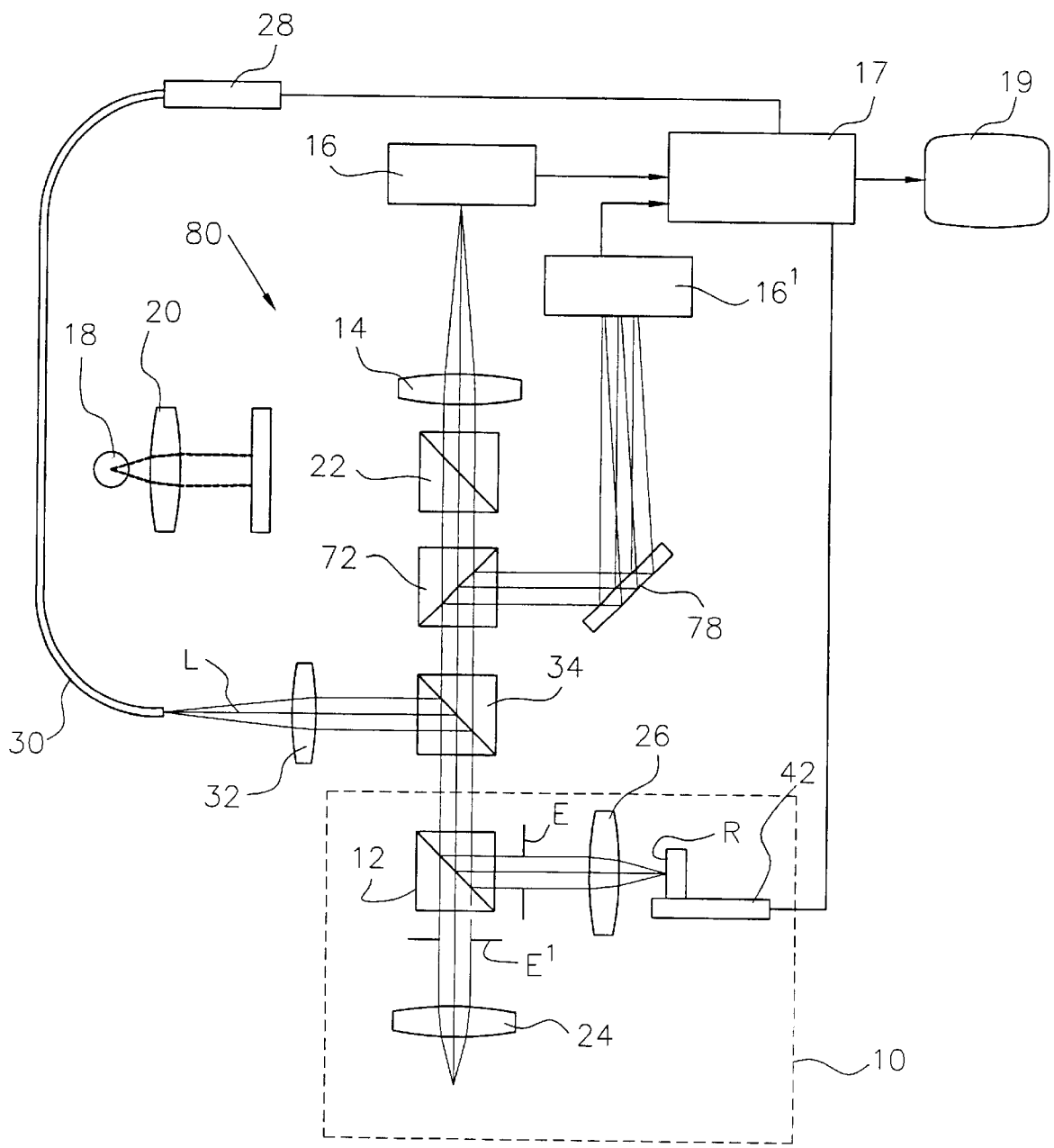
FIG. 13 illustrates an embodiment of the invention implemented by adding an additional sensor array solely for the purpose of calibration.

It is also noted that the return wavefront RB in all embodiments illustrated in the figures is directed to the sensor array 16 of the interference microscope in order to utilize hardware already available to perform interferometric measurements. On the other hand, the concept of the invention could be carried out in equivalent fashion by adding additional detector hardware 16' solely for the purpose of calibration, as illustrated schematically with the embodiment 80 of FIG. 13 with reference to the shear-plate implementation. It is also understood that the shape of the return wavefront may be determined by various other tests known in the art, such as, without limitation, the knife-edge, wire, and screen tests.

Various changes in the details, steps and components that have been described may be made by those skilled in the art within the principles and scope of the invention herein illustrated and defined in the appended claims. For example, it is anticipated that the concepts of the invention can be implemented by combinations of conventional optical devices that are different from what has been illustrated herein, but with equivalent functional objectives and results. Therefore, while the present invention has been shown and described herein in what is believed to be the most practical and preferred embodiments, it is recognized that departures can be made therefrom within the scope of the invention, which is not to be limited to the details disclosed herein but is to be accorded the full scope of the claims so as to embrace any and all equivalent processes and products.

We claim:

1. An apparatus for calibrating the in-focus position of a reference mirror in an interference microscope objective, comprising:

a light source adapted to provide a light beam directed to a reference mirror;

means for determining a shape of a return wavefront reflected from the reference mirror; and focusing means for translating the reference mirror to an in-focus position.

2. The apparatus of claim 1, further comprising a conoscopic imaging lens positioned in an optical path of the interference microscope for imaging an exit pupil of the objective on a light-intensity sensor.

3. The apparatus of claim 2, further comprising means for alternatively placing said conoscopic imaging lens in the optical path of the interference microscope or removing said lens from the optical path of the interference microscope.

4. The apparatus of claim 1, wherein said light source is a laser.

5. The apparatus of claim 1, further comprising means for automatically determining said shape of the return wavefront reflected from the reference mirror.

6. The apparatus of claim 5, further comprising a conoscopic imaging lens positioned in an optical path of the interference microscope for imaging an exit pupil of the objective on a light-intensity sensor.

7. The apparatus of claim 6, further comprising means for alternatively placing said conoscopic imaging lens in the optical path of the interference microscope or removing said lens from the optical path of the interference microscope.

8. The apparatus of claim 5, wherein said light source is a laser.

9. The apparatus of claim 5, further comprising means for displaying an interferogram corresponding to said shape of the return wavefront reflected from the reference mirror.

10. The apparatus of claim 9, further comprising a conoscopic imaging lens positioned in an optical path of the interference microscope for imaging an exit pupil of the objective on a light-intensity sensor.

11. The apparatus of claim 10, further comprising means for alternatively placing said conoscopic imaging lens in the optical path of the interference microscope or removing said lens from the optical path of the interference microscope.

12. The apparatus of claim 9, wherein said light source is a laser.

13. The apparatus of claim 5, further comprising means for automatically controlling said focusing means to translate the reference mirror toward an in-focus position.

14. The apparatus of claim 13, further comprising a conoscopic imaging lens positioned in an optical path of the interference microscope for imaging an exit pupil of the objective on a light-intensity sensor.

15. The apparatus of claim 14, further comprising means for alternatively placing said conoscopic imaging lens in the optical path of the interference microscope or removing said lens from the optical path of the interference microscope.

16. The apparatus of claim 13, wherein said light source is a laser.

17. The apparatus of claim 13, further comprising means for displaying an interferogram corresponding to said shape of the return wavefront reflected from the reference mirror.

18. The apparatus of claim 17, further comprising a conoscopic imaging lens positioned in an optical path of the interference microscope for imaging an exit pupil of the objective on a light-intensity sensor.

19. The apparatus of claim 18, further comprising means for alternatively placing said conoscopic imaging lens in the optical path of the interference microscope or removing said lens from the optical path of the interference microscope.

20. The apparatus of claim 19, wherein said light source is a laser.

21. The apparatus of claim 1, wherein said means for determining a shape of a return wavefront reflected from the reference mirror comprises:
   a calibration reference surface adapted to reflect a calibration beam in optical alignment with an optical path of the interference microscope; and
   a beam splitter dividing said light beam into said calibration beam and a reference beam directed to said reference mirror.

22. The apparatus of claim 1, wherein said return wavefront is directed to a light-intensity sensor and said means for determining a shape of the return wavefront reflected from the reference mirror comprises a second light source adapted to provide a light beam directed to the light-intensity sensor.

23. The apparatus of claim 22, wherein said second light source is produced by a fiber-optic splitter.

24. The apparatus of claim 1, wherein said means for determining a shape of the return wavefront reflected from the reference mirror comprises a shearing interferometer placed in an optical path of the return wavefront to a light-intensity sensor.

25. The apparatus of claim 1, wherein said light beam is collimated.

26. The apparatus of claim 21, wherein said light beam is collimated.

27. The apparatus of claim 22, wherein said light beam is collimated.

28. The apparatus of claim 24, wherein said light beam is collimated.

29. A method for calibrating the in-focus position of a reference mirror in an interference microscope objective, comprising the steps of:
   (a) providing a light beam;
   (b) directing said light beam toward a reference mirror;
   (c) determining a shape of a return wavefront reflected from the reference mirror;
   (d) determining a position of the reference mirror relative to an in-focus position thereof as a function of said shape of the return wavefront reflected from the reference mirror; and
   (e) translating the reference mirror toward said in-focus position.

30. The method of claim 29, wherein said step (c) comprises the step of providing an interferogram between said return wavefront and a collimated calibration beam.

31. The method of claim 30, wherein said step (c) further comprises the step of imaging an exit-pupil of the microscope objective on a light-intensity sensor.

32. The method of claim 31, wherein said imaging step is carried out with a conoscopic imaging lens in an optical path of the interference microscope.

33. The method of claim 29, wherein said light beam is produced with a laser and collimated.

34. The method of claim 33, wherein said step (c) comprises the step of providing an interferogram between said return wavefront and a collimated calibration beam.

35. The method of claim 34, wherein said step (c) further comprises the step of imaging an exit-pupil of the microscope objective on a light-intensity sensor.

36. The method of claim 35, wherein said imaging step is carried out with a conoscopic imaging lens in an optical path of the interference microscope.

37. The method of claim 29, wherein said steps (c), (d) and (e) are carried out automatically.

38. The method of claim 37, wherein said step (c) comprises the step of providing an interferogram between said return wavefront and a collimated calibration beam.

39. The method of claim 38, wherein said step (c) further comprises the step of imaging an exit-pupil of the microscope objective on a light-intensity sensor.

40. The method of claim 39, wherein said imaging step is carried out with a conoscopic imaging lens in an optical path of the interference microscope.

41. The method of claim 38, further comprising the step of displaying said interferogram.

42. The method of claim 29, wherein said light beam is collimated and step (c) includes the steps of:
  i.) splitting said collimated light beam into a calibration beam and a reference beam directed toward the reference mirror; and
  ii.) producing an interferogram between said calibration beam and said return wavefront from the reference mirror.

43. The method of claim 42, further including the steps of:
  iii.) providing a calibration reference surface; and
  iv.) directing said calibration beam toward the calibration reference surface to produce a collimated calibration beam for interference with said return wavefront.

44. The method of claim 29, wherein said step (c) includes the steps of:
  i.) passing said return wavefront through a shearing interferometer to produce two beams; and
  ii.) producing an interferogram between said two beams.

45. The method of claim 29, wherein said step (c) includes performing phase-shifting measurements.

46. The method of claim 42, wherein said step (c) includes performing phase-shifting measurements.

47. The method of claim 44, wherein said step (c) includes performing phase-shifting measurements.

48. The method of claim 29, wherein said light beam is collimated.

49. The method of claim 44, wherein said light beam is collimated.

* * * * *